S. R. BAILEY, DEC'D.
M. L. WOOD, EXECUTRIX.
FRICTION JOINT FOR WIND SHIELDS.
APPLICATION FILED OCT. 25, 1916.
1,284,211.
Patented Nov. 12, 1918.
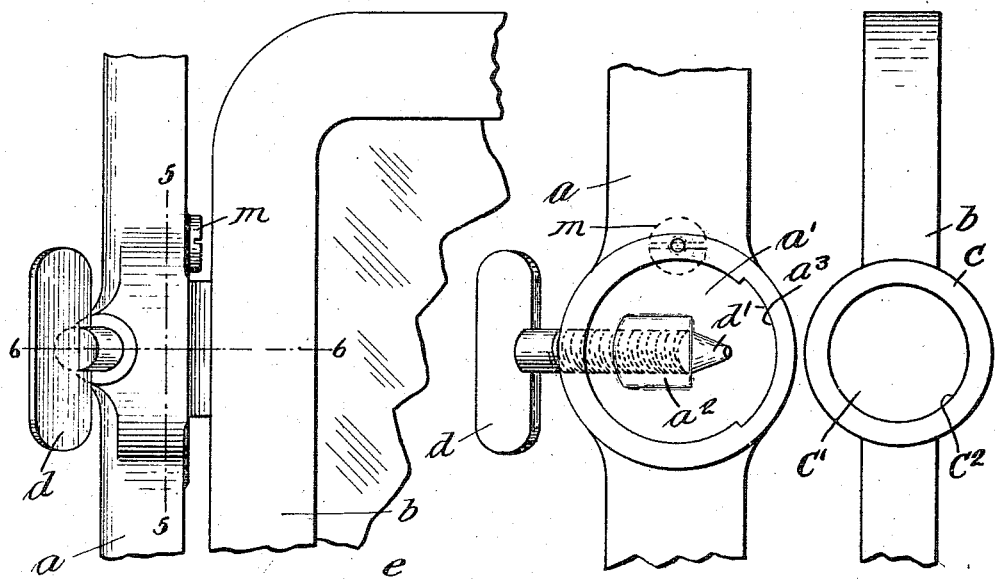
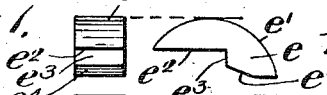
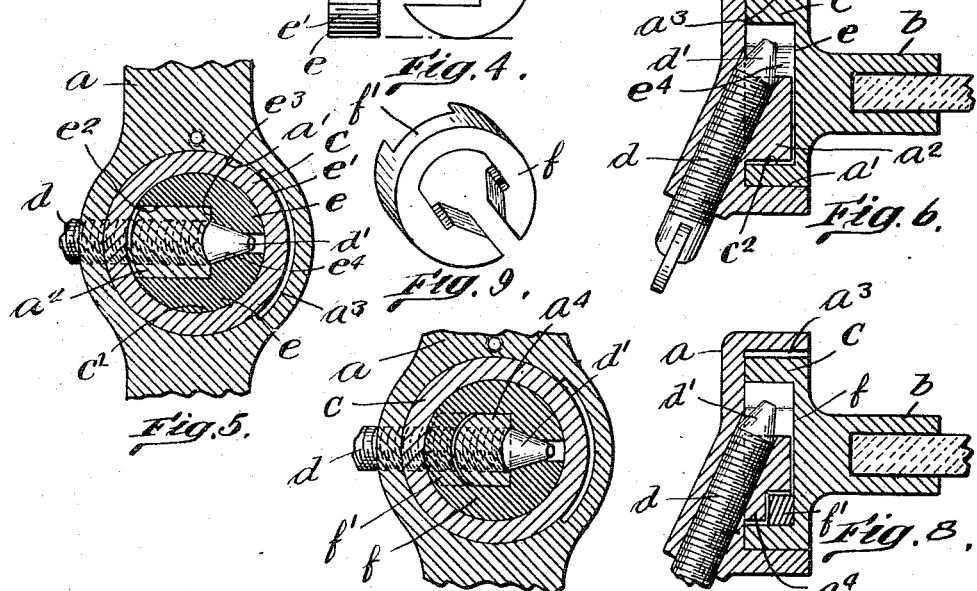
Witness.
H. B. Davis.
Inventor.
Samuel R. Bailey
by Noyes & Hammann
Atty's

UNITED STATES PATENT OFFICE.

SAMUEL R. BAILEY, OF AMESBURY, MASSACHUSETTS; MARCIA L. WOOD EXECUTRIX OF SAMUEL R. BAILEY, DECEASED.

FRICTION-JOINT FOR WIND-SHIELDS.

1,284,211.      Specification of Letters Patent.      Patented Nov. 12, 1918.

Application filed October 25, 1916. Serial No. 127,695.

*To all whom it may concern:*

Be it known that I, SAMUEL R. BAILEY, a citizen of the United States, residing at Amesbury, in the county of Essex and State of Massachusetts, have invented an Improvement in Friction-Joints for Wind-Shields, of which the following is a specification.

This invention relates to certain improvements in friction or lock joints for automobile wind-shields, and more particularly to certain improvements on the particular type of joint disclosed in my Patent No. 1,214,260, in which a locking screw in the fixed member is arranged to engage the interior side wall of a cup-like recess formed in the end of the trunnion of the movable member, to force the trunnion against one side of the bearing cup in the fixed member, thereby causing a frictional engagement between the exterior of the trunnion and the interior of the bearing cup and between the interior of the trunnion and the beveled end of the locking screw.

While the above-described device obviates certain objections to the construction disclosed in my prior Patent #1,171,829, I have ascertained that it is difficult to lock the joint with sufficient firmness to meet all conditions, and that, if the position of the movable member is frequently changed, while the parts are frictionally engaged with considerable force, an objectionable wearing effect takes place between the beveled end of the locking screw and the interior surface of the trunnion recess. Moreover, the transverse strain which is applied to the locking screw, when the parts are locked, is liable to be of such force as to break the screw.

The object of my invention is to obviate the objections to my said prior device above referred to, by increasing the area of frictional engagement between the joint members, so that the extent of frictional engagement therebetween may be substantially increased and more accurately varied, further, by obviating the necessity of direct frictional engagement between the locking screw and the trunnion of the movable member and by preventing the application of transverse strain thereto.

I accomplish these objects, primarily, by providing within the trunnion recess, an expansible bearing member, which is arranged to be forced into engagement with the trunnion, to provide an internal, frictional bearing therefor, and which is held against relative turning movement directly by the fixed member, so that the locking screw is relieved from direct engagement with the rotating parts and from all transverse strain, and which, at the same time, is forced laterally by the forcing action of said screw, so that the trunnion is pressed in the same direction against its external bearing, and a strong frictional engagement is caused between both the exterior and interior surfaces of the trunnion and the fixed member.

In the accompanying drawing, in which an embodiment of my invention is shown:

Figure 1 is a side elevation of the left-hand joint of a wind-shield support, embodying my invention.

Figs. 2 and 3 are detail views of the fixed and movable members, respectively.

Fig. 4 is a detail side and edge view of one form of wedging member which I employ.

Fig. 5 is a sectional view at the line 5—5 of Fig. 1.

Fig. 6 is a sectional view at the line 6—6 of Fig. 1.

Fig. 7 is a sectional view of a somewhat modified form of my invention, taken at the line corresponding to the line 5—5, Fig. 1.

Fig. 8 is a sectional view of the form shown in Fig. 7, taken at the line corresponding to the line 6—6, Fig. 1.

Fig. 9 is a detail view of the wedging device employed in the form of Figs. 7 and 8.

In the drawing, $a$ indicates the left-hand standard or portion of the frame which constitutes the fixed member of the joint, and $b$ the wind shield, which is supported thereby and constitutes the movable member of the joint. The fixed member $a$ is provided with a circular recess $a'$ in one side, to form a bearing cup, which is adapted to receive the trunnion $c$ of the movable member, and provide a bearing therefor. The end-portion of the trunnion is made tubular or has a circular recess $c'$ formed therein, which is arranged concentrically with its outer surface. An oblong-shaped boss $a^2$ is formed integrally with the fixed member and projects from the bottom of the bearing cup $a'$, into said recess $c'$, in close proximity to the bottom of the latter, and a locking screw $d$, having a conical-shaped end-face $d'$ is arranged to extend through the bottom of said bearing cup and through said boss, in a position in which its axial line intersects the axis of the trunnion $c$ at an oblique angle.

I further provide, within the trunnion recess $c'$, an expansible bearing member, of disk-like form, which, in the form of my invention shown in Figs. 4, 5, and 6, is split or separated diametrically, to form a pair of correspondingly-shaped sections $e$. The peripheral edges $e'$ of said sections are formed to fit the internal bearing surface formed by the recess $c'$, in the trunnion $c$, and the internal, or adjacent edges, are formed to provide longitudinal faces $e^2$, and transverse faces or shoulders $e^3$, which are adapted, when in position, to fit against the opposite sides and one end of the boss $a^2$, respectively, and also convergently-disposed wedging faces $e^4$, which extend obliquely from the transverse faces $e^3$, at an angle corresponding to the angle of inclination of the conical face $d'$ on the end of the screw $d$, and in position to be engaged thereby. As thus formed, the expansible member $e$ occupies practically the entire space in the end recess $c'$ of the trunnion which is not occupied by the boss $a^2$, and the projecting end of the screw $d$, except a small space directly beyond the end of the screw, into which the latter is adapted to be forced, and, as the boss $a^2$ is of oblong form, and furthermore is somewhat "off-center", with relation to the axis of the trunnion $c$, it will be apparent that the member $e$ is firmly held against rotation with relation to the fixed member $a$.

As in the device of my prior Patent #1,179,829, the bearing cup $a'$ of the fixed member is provided with a recess $a^3$, which leads from the bearing surface thereof and extends throughout approximately one-fourth of the circumference, said recess being so arranged that it is bisected by the horizontal plane in which the axes of the screw $d$ and trunnion $c$ lie.

In case the joint is used in connection with shield-supporting standards which are not connected at the top, and are liable to spring apart, I provide a screw $m$ which is threaded in the standard, and the head of which overlaps the outer side of the trunnion $c$, as indicated in Figs. 1 and 2, to hold said trunnion securely within the bearing cup of the fixed member.

The parts being in position and constructed as above described, when the screw is withdrawn from engagement with the member $e$, the trunnion $c$ will be free to rotate in the fixed member. When the screw is forced inwardly, its conical end will engage the oblique faces $e^4$ of said member, and force them apart, and into close engagement with the inner peripheral surface $c^2$ of the trunnion, causing a frictional engagement therebetween, the strength of which will be directly proportioned to the pressure which is applied thereto by the screw. In addition to the wedging action of the screw on the members $e$, a component of the force which is applied thereto will be directed axially of the screw, which will cause said members to be pressed in that direction also, and, as only a limited separation of the members $e$ is permitted by the confines of the recess in the trunnion, the force of the screw will be, practically, entirely effective, through said members, in pressing the trunnion laterally into the bearing recess $a^3$, and against the surface portion adjacent thereto, so that an effective locking engagement between the trunnion and the fixed member will be caused both internally and externally of the trunnion.

It will be observed that, with the above-described construction, there is no direct or frictional engagement between the locking screw and the parts which are movable relative thereto, and also that there is no substantial transverse strain on the screw when the parts are locked or held in frictional engagement; any tendency to turn the expansible bearing $e$ being resisted by the boss $a^2$, which is formed integrally with the fixed member. As a strong frictional engagement may thus be caused between both the inner and outer periphery of the trunnion and the fixed member, the parts may be firmly locked together.

In case the joint members are to be relatively moved when the parts are frictionally engaged, only to an extent permitting such movement, the surfaces which will be thus subjected to wear will not be substantially affected even after a long period of use, as the wearing surfaces extend over the greater portion of a circumference.

In Figs. 7, 8, and 9, I show a somewhat modified form of the above-described invention. In this form of my invention, the expansible bearing member $f$, which corresponds to the members $e$, is formed in one piece, the portions corresponding to the separate parts thereof being connected by an intermediate portion $f'$, which is adapted to yield, to permit the portions which it connects to be forced into engagement with the inner periphery of the trunnion, and which will withdraw said portions out of forcible engagement therewith, when the pressure thereon is removed.

While the connecting portion $f'$, may be of the same thickness as the other portions of the member, it is preferably recessed at the side next the fixed member to permit a portion $a^4$ of the boss to be extended adjacent the inner periphery of the trunnion, as in the previously-described form of the invention, thus providing a bearing, for holding the expansible member from turning, which is of the same length as that in said previously-described form.

The manner in which the parts operate, to provide the desired frictional engagement, is similar to that of the form already described, except that the spreading action of the screw on the expansible bearing is against the spring action of the connecting portion $f'$, the side portions of the bearing being automatically returned to normal position when the screw is withdrawn. As a slight lateral motion of the expansible bearing is necessary, in each form, to cause the trunnion to be pressed laterally in its external bearing, a slight looseness, in the general direction of the axis of the screw, is provided for between the bearing $f$ and the boss $a^4$, as shown in Figs. 7 and 8, so that the connecting portion $f'$ cannot, at any time, be forced against said boss.

The form last described, is principally advantageous over the other form in that there is less liability that the contacting surfaces of the expansible bearing and the trunnion will adhere, so that they will not readily disengage when the screw is moved to release the parts, as the spring action of the intermediate portion $f'$ constantly tends to draw said surfaces out of engagement with the internal bearing surface of the trunnion, when the connected portions have been forced apart by the screw.

It will be understood that the terms "fixed" and "movable" members are used relatively in the claims.

I claim:—

1. A friction joint comprising a fixed member having a bearing recess, a movable member having a trunnion journaled in said recess, said trunnion having an internal chamber providing concentric external and internal bearing surfaces, an expansible bearing member held against rotation by the fixed member and disposed within said chamber in position to provide an internal bearing for the trunnion, and means to expand said bearing member into frictional engagement with said trunnion.

2. A friction joint comprising a fixed member having a bearing recess, a movable member having a trunnion journaled in said recess, said trunnion having an internal chamber providing concentric external and internal bearing surfaces, an expansible bearing member held against rotation by the fixed member and disposed within said chamber in position to provide an internal bearing for the trunnion, and a screw in said fixed member arranged to expand said bearing member and press said trunnion laterally.

3. A friction joint comprising a trunnion having concentrically disposed external and internal bearing surfaces, a support having a bearing surface arranged to receive the external bearing surface of the trunnion, to provide a bearing therefor, an expansible bearing member arranged within said internal bearing surface, and a screw in said support arranged to expand said bearing member into frictional engagement with said internal bearing surface.

4. A friction joint comprising a fixed member, a movable member having a trunnion externally journaled in said fixed member and having an end recess providing an internal bearing surface concentric with its external bearing surface, an expansible bearing member disposed in said end recess and formed to provide a bearing for said internal bearing surface of the trunnion, means on said fixed member arranged to engage said bearing member, to hold the same against rotation, and a screw in said fixed member having a tapering end-portion arranged to be forced into engagement with said bearing member to spread the same into frictional engagement with said internal bearing surface.

5. A friction joint comprising a fixed member, a movable member having a trunnion externally journaled in said fixed member, and having an end recess providing an internal bearing surface concentric with the external bearing surface thereof, a bearing member in said recess having oppositely disposed sections provided with external surfaces corresponding in curvature to the internal bearing surface of the trunnion, and a screw in said fixed member arranged to be forced between said sections to force them apart into frictional engagement with said internal surface.

6. A friction joint comprising a fixed member, a movable member having a trunnion externally journaled in said fixed member, and having an end-recess providing an internal bearing surface concentric with the external bearing surface thereof, a bearing member in said recess having oppositely-disposed sections provided with external surfaces corresponding in curvature to the internal bearing surface of the trunnion, and a screw in said fixed member arranged to be forced between said sections, to spread them apart into frictional engagement with said internal surface, and means on said fixed member independent of said screw for holding said bearing-member against rotation with the trunnion.

7. A friction joint comprising a fixed member having a bearing recess, a trunnion externally journaled in said recess, and having a recessed end-portion providing an internal bearing surface concentric with the external bearing surface thereof, a friction disk arranged in the recessed end-portion of the trunnion, and having oppositely-disposed sections exteriorly corresponding to said internal bearing surface and provided with adjacently-disposed wedging faces, and a screw in said fixed member arranged to be forced between said faces in a direction oblique to the axis of the trunnion.

8. A friction joint comprising a fixed member having a bearing recess, a trunnion externally journaled in said recess, and having a recessed end-portion providing an internal bearing surface concentric with the external bearing surface thereof, a friction disk arranged in the recessed end-portion of the trunnion, and having oppositely-disposed sections exteriorly corresponding to said internal bearing surfaces, a projection rigid with the fixed member and extending between said sections in position to hold the same against rotation with relation to said fixed member, and a screw in said fixed member arranged to be forced between said sections to force the same into frictional engagement with said internal bearing surface.

9. A friction joint comprising a fixed member having a bearing recess, a trunnion externally journaled in said recess, and having a recessed end-portion providing an internal bearing surface concentric with the external bearing surface thereof, a friction disk arranged to fit into and freely rotate in said recessed end-portion of the trunnion, and diametrically slotted to provide oppositely-disposed clamping sections and an intermediate resilient section, and a locking screw in said fixed member arranged to be forced into the slot of said disk to spring apart said clamping sections into frictional engagement with the internal bearing surface of the trunnion.

10. A friction joint comprising a fixed member having a bearing recess, a trunnion externally journaled in said recess, and having a recessed end-portion providing an internal bearing surface concentric with the external bearing surface thereof, a friction disk arranged in the recessed end-portion of the trunnion, and having oppositely-disposed sections exteriorly corresponding to said internal bearing surfaces, and having an angular-shaped opening therebetween, a boss formed rigidly with said fixed member in position to project from the bottom of its bearing recess and correspondingly shaped and arranged to fit into said opening, to hold said disk against rotation with relation thereto, but permitting lateral movement of the disk therein in the diametrical line between said sections, and a screw in said fixed member extending between said sections in the direction of said diametrical line and oblique to the axis of the trunnion, to force said sections apart transversely of the screw and to force them longitudinally thereof, frictionally to engage the trunnion internally and to press the trunnion against one side of the bearing recess of the fixed member.

In testimony whereof, I have signed my name to this specification.

SAMUEL R. BAILEY.

Witnesses:
L. H. HARRIMAN,
H. B. DAVIS.

Copies of this patent may be obtained for five cents each, by addressing the "Commissioner of Patents, Washington, D. C."